W. F. ROSE.
COTTON PICKER.
APPLICATION FILED JAN. 15, 1916.

1,274,335.

Patented July 30, 1918.

Witnesses
J. P. Wahler
Rob Meyer

Inventor
W. F. Rose.
By [signature], Attorney

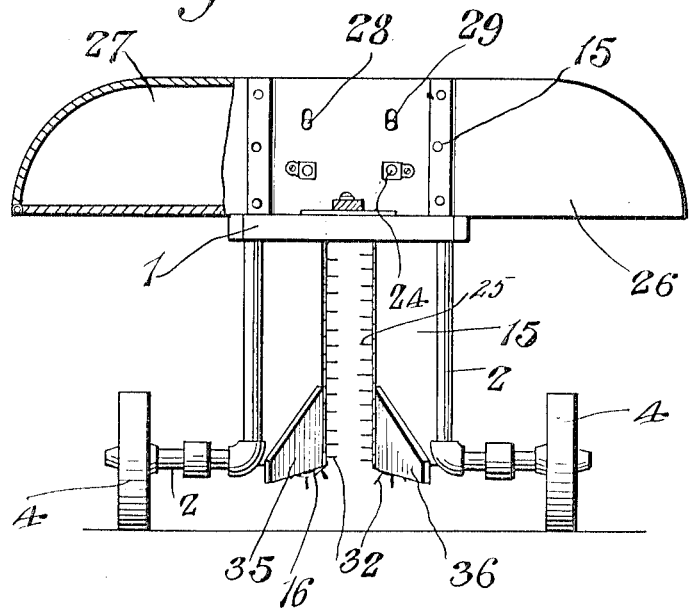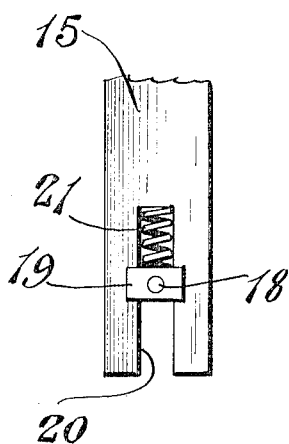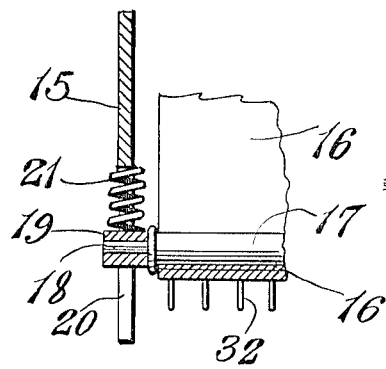

UNITED STATES PATENT OFFICE.

WILHELM F. ROSE, OF LA MOURE, NORTH DAKOTA.

COTTON-PICKER.

1,274,335.  Specification of Letters Patent.  Patented July 30, 1918.

Application filed January 15, 1915. Serial No. 2,480.

*To all whom it may concern:*

Be it known that I, WILHELM F. ROSE, a citizen of the United States, residing at La Moure, in the county of La Moure and State of North Dakota, have invented certain new and useful Improvements in Cotton-Pickers; and I do hereby declare the following to be a full, clear, and exact description of the invention, such as will enable others skilled in the art to which it appertains to make and use the same.

This invention relates to cotton pickers or harvesters, and the primary object of the invention is the provision of a cotton picker or harvester which is provided with a plurality of vertically traveling picking members, which will gather the cotton from the plants and elevate it for depositing in any suitable type of receptacle.

Another object of this invention is the provision of guiding boards hingedly connected to the front end or forwardly of said picker elements, for properly guiding the stalks or plants of the cotton to the picking elements for efficiently picking the cotton.

With the foregoing and other objects in view, this invention consists in such novel features of construction, combination, and arrangement of parts as will be hereinafter more fully described, illustrated in the accompanying drawings, and claimed.

In describing the invention in detail, reference will be had to the accompanying drawings, wherein like characters of reference designate like or corresponding parts throughout the several views, and in which:—

Fig. 3 is a front elevation of the cotton harvester.

Fig. 4 is a detail view of a part of the construction employed in the harvester, Fig. 5 is a cross sectional view on the line 5—5 of Fig. 4, Fig. 6 is a detail view of a part of the construction used for gathering the cotton from the picking elements, and Fig. 7 is a detail perspective view of a part of the construction of the picking element.

Figure 1:
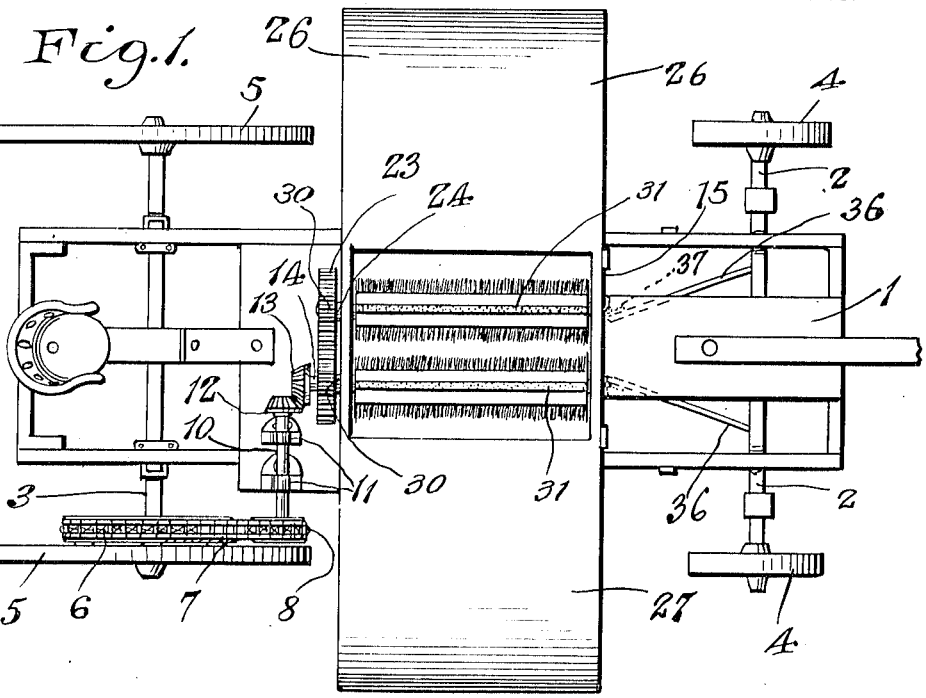
Figure 1 is a top plan view of the improved cotton harvester.
Figure 2:
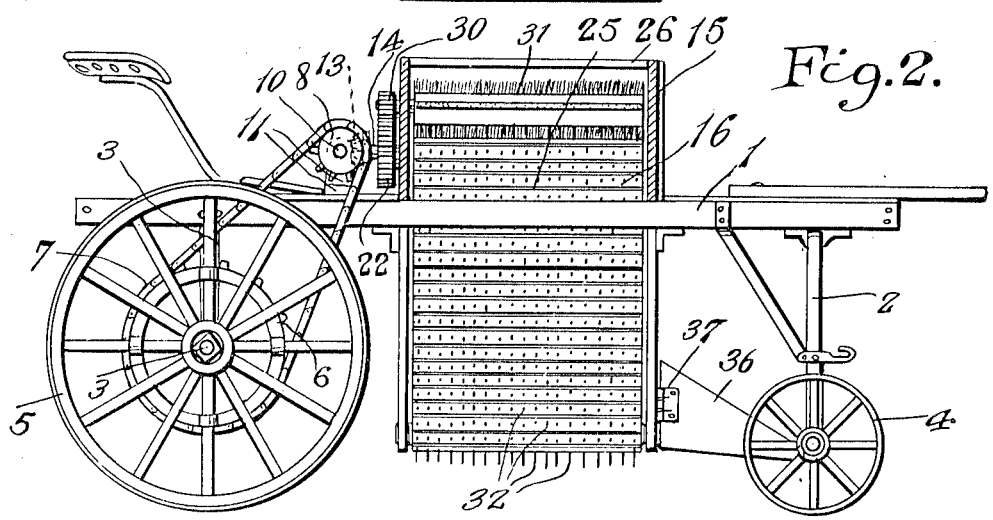
Fig. 2 is a side elevation of the cotton harvester, showing parts thereof in section.

Referring more particularly to the drawings, 1 designates the supporting frame of the cotton picker which has depending U front and rear axles 2 and 3, which axles have mounted upon their terminal ends the wheels 4 and 5. The front wheels 4 of the cotton picker are of smaller diameter than the rear wheels 5, so as not to obstruct the passage of the pickers between or among the growing plants.

One of the rear wheels 5 of the cotton picker has a crown sprocket 6 secured thereto, which sprocket has a sprocket chain 7 passing thereabout and around a sprocket 8.

The sprocket 8 is mounted upon a stub shaft 10, which stub shaft is supported by suitable bearings 11 mounted upon the upper surface of the supporting structure or frame 1, and the shaft has a bevel gear 12 mounted upon its inner terminal end, which bevel gear meshes with a second bevel gear 13. The bevel gear 13 is mounted upon the terminal end of a shaft 14, which shaft is supported longitudinally of the cotton picker by an auxiliary frame 15. The shaft 14 extends entirely across the auxiliary supporting frame 15, and it has a roller (not shown) mounted thereupon, about which a picking or gathering conveyer 16 travels. The picking or gathering conveyer 16 also travels about a roller 17, which is yieldably supported at the lower end of the auxiliary frame 15, and the picking conveyer 16 travels vertically upon the rotation of the shaft 14 and the roller carried thereby.

The roller 17 is yieldably supported in the lower end of the auxiliary frame 15 by having its reduced end 18 inserted in boxes 19. The boxes 19 are provided with recessed ends, which ends slidably receive the edges of the auxiliary frame 15, which are adjacent or face the recesses 20 formed therein. The recesses 20 are formed for the reception of the blocks 19 and to permit of their sliding movement therein. Expanding coil springs 21 are secured to the auxiliary supporting frame 15 and abut the upper surface of the blocks or boxes 19, as is clearly shown in Figs. 4 and 5 of the drawings, thereby properly tensioning the picking or gathering conveyer 16, so as to hold the same taut at all times.

The shaft 14 has a gear 22 mounted thereupon, which meshes with a gear 23 mounted upon the shaft 24. The shaft 24 is carried by the auxiliary casing 15, and parallel to the shaft 14, having a picking or gathering conveyer 25 mounted upon rollers (not shown) which rollers are mounted longitudinally on the shaft. By the geared connection between the shafts 14 and 24, the picking or gathering conveyers 16 and 25 will be operated so that their meeting faces or the inner sides of the conveyer will both travel upwardly upon the rotation of the shaft, while the outermost sides of the conveyers will travel downwardly, so as to carry the cotton gathered thereby upwardly and into the retaining receptacles 26 and 27 which extend transversely to the frame 1 and are positioned upon the upper end thereof, as is clearly shown in Fig. 3 of the drawings.

Transverse shafts 28 and 29 are carried by the auxiliary supporting frame 15, and are positioned above the shafts 14 and 24, and have pinions 30 mounted upon their projecting ends, which pinions mesh with the gears 22 and 23 for rotating the shafts 28 and 29. The shafts 28 and 29 have rotary brushes 31 mounted thereupon, which brushes engage the teeth or picking fingers 32 which are formed upon the outer surface of the picking or gathering conveyers 16 and 25, for collecting the cotton gathered by the fingers and depositing it into the retaining receptacles 26 and 27.

Guiding wings 35 and 36 are hingedly connected as at 37 to the auxiliary frame 15, and forwardly of the gathering conveyers, which wings flare outwardly and form guideways for guiding the stalks of the cotton plant between the two gathering conveyers, so as to insure the engagement of the gathering fingers 32 with the cotton plant for the gathering of the cotton therefrom. The hinges 37 are constructed so they will hold the wings steady under ordinary pressure, and so that a relatively strong pressure must be administered to the wings for hingedly moving them.

In the operation of the improved cotton picker; the traction of the supporting frame will, through the medium of the sprocket chain 7 and the sprockets 6 and 8, rotate the shaft 11, which will in turn rotate the shafts 14 and 24, moving the gathering conveyers in a vertical movement, so that the fingers 32 carried thereby, will upon engagement with a cotton plant, commence at the bottom of the plant and strip the same of all of the pods of ripe cotton therefrom, which cotton will be retained by the fingers until the brushes 31 are reached, which brushes will clean or gather the cotton from the gathering fingers and deposit it into the retaining receptacles 26 and 27, from which it may be emptied at the will of the operator.

From the foregoing description, taken in connection with the accompanying drawings, the advantages of the construction and of the method of operation of the improved cotton picker will be readily apparent to those skilled in the art to which this invention appertains, and, while in the foregoing the principle of the operation has been described, together with various features of construction, it is to be understood that certain minor features of construction, combination, and arrangement of parts may be altered to suit practical conditions, provided such alterations are comprehended within the scope of what is claimed.

What is claimed is:—

In a cotton picker structure a supporting frame including a plurality of depending plates provided with vertical recesses extending upwardly from their lower ends, bearing blocks slidably mounted in said recesses, guiding flanges formed upon said bearing blocks, a pair of vertical cotton picking conveyers carried by said frame, operating rollers for said conveyers, means for operating said operating rollers, guiding rollers for said conveyers, said guiding rollers having their ends reduced and mounted in said bearing blocks, and helical springs seated in said recesses and engaging said blocks to yieldably hold said conveyers taut under expansion and contraction of the conveyers.

In testimony whereof I affix my signature in presence of two witnesses.

WILHELM F. ROSE.

Witnesses:
F. P. BANKER,
J. N. MALLON.